United States Patent [19]

Yoshida

[11] Patent Number: 5,208,660
[45] Date of Patent: May 4, 1993

[54] TELEVISION DISPLAY APPARATUS HAVING PICTURE-IN-PICTURE DISPLAY FUNCTION AND THE METHOD OF OPERATING THE SAME

[75] Inventor: Shigeo Yoshida, Kashiwa, Japan

[73] Assignee: Sharp Kabushiki Kaisha, Osaka, Japan

[21] Appl. No.: 821,236

[22] Filed: Jan. 10, 1992

Related U.S. Application Data

[63] Continuation of Ser. No. 557,547, Jul. 24, 1990, abandoned.

[30] Foreign Application Priority Data

Jul. 29, 1989 [JP] Japan ................................. 1-197780
Jul. 29, 1989 [JP] Japan ................................. 1-197781

[51] Int. Cl.$^5$ ............................................. H04N 5/45
[52] U.S. Cl. ..................................... 358/22; 358/183
[58] Field of Search .................................. 358/22, 183

[56] References Cited

U.S. PATENT DOCUMENTS

| | | | |
|---|---|---|---|
| 4,267,560 | 5/1981 | Ishikawa et al. | 358/22 |
| 4,811,103 | 3/1989 | Casey | 358/22 |
| 4,816,915 | 3/1989 | Imai et al. | 358/181 |
| 4,982,288 | 1/1991 | Isobe et al. | 358/183 |
| 4,984,083 | 1/1991 | Okamoto et al. | 358/22 |

FOREIGN PATENT DOCUMENTS

| | | | |
|---|---|---|---|
| 37778 | 4/1981 | Japan | 358/183 |
| 59-37913 | 12/1984 | Japan . | |
| 47280 | 2/1987 | Japan . | |
| 200681 | 8/1988 | Japan . | |
| 86769 | 3/1989 | Japan . | |

Primary Examiner—John W. Shepperd
Attorney, Agent, or Firm—David G. Conlin; George W. Neuner

[57] ABSTRACT

A television display apparatus is disclosed for forming a small image area in accord with the television signal of a standard system within one portion of the region of a large image area on the screen in accord with the television signal of an HDTV system. The apparatus displays a picture in the small image area within the large area by locally substituting for a first signal to display on the screen a composite picture having a picture of a second signal nested in the picture of the first signal. The apparatus uses three field memories each having a video signal of the second television signal written therein with the cycle. Field detecting apparatus determines whether the video signal in each television signal is a signal form the first field or the second field. The field memory that is not being currently written and has a field which is identical to that of the video signal included in the first television signal being currently scanned is selected for the composite picture.

11 Claims, 7 Drawing Sheets

→ HORIZONTAL SCANNING DIRECTION

SAMPLING PATTERN

TELEVISION DISPLAY APPARATUS HAVING PICTURE-IN-PICTURE DISPLAY FUNCTION AND THE METHOD OF OPERATING THE SAME

This is a continuation of copending application Ser. No. 07/557,547 filed on Jul. 24, 1990, now abandoned.

BACKGROUND OF THE INVENTION

1. Field of the Invention

The invention relates generally to television display apparatuses having two image areas on a screen, and more particularly, to a television display apparatus having picture-in-picture display function for displaying television signal from one signal source in a large image area on a screen of the display apparatus, while displaying television signal from the other signal source in a small image area which is a portion within the large image area on the screen of the display apparatus, in accordance with video signals included in the generated television signals from two signal sources, and a method of picture-in-picture display.

2. Description of the Background Art

Various types of television display apparatuses having a picture-in-picture display function are already proposed. For example, Japanese Patent Publication No. 59-37913 discloses a television receiver receiving television signals of the NTSC system transmitted from two broadcasting stations and having a picture-in-picture display function for displaying a picture of one broadcasting station's television signal as a scale-reduced picture in an area within the display area of the picture displayed by the other broadcasting station's television signal (hereinafter referred to as PinPTV receiver).

In summary, the PinPTV receiver of the above mentioned prior art comprises two field memories for storing the first field and the second field of television signal of the small image area, a first field detecting circuit for detecting whether the television signal of the large image area is of the first field or the second field, a second field detecting circuit for detecting whether the television signals of the small image areas is of the first field or the second field, and a memory controller for delaying the reading of the television signal of the small image area by one horizontal scanning period when the television signal of the large image area is of the second field and the television signal of the small image area is of the first field.

The object of the above mentioned prior art is to reverse the interlace relation when the television signal of the large image area is of the second field and the television signal of the small image area is of the first field to obtain an appropriate small image area. In the case of reading the first field of the small image area when the video signal of the large image area is the second field, the memory controller delays the first field of the small image area by one horizontal scanning period to prevent the reverse of the interlace relation, thereby to achieve an appropriate picture.

In recent years, a high definition television system other than the standard television system is proposed as the television system. In such a case, displaying in combination an image area of television signal under the standard television system within one area of a large image area of television signal under the high definition television system is considered, for example.

A method for band-compressing the television signals of the above mentioned high definition television system (1125 lines, 60 fields) and transmitting the same has already been proposed. The proposed method includes multiplex sub-sampling transmission method employing offset sub-sampling between fields and frames. A system called MUSE (Multiple Sub-Nyquist Sampling Encoding) is known as one type of multiplex sub-sampling transmission system.

The decoder of such a MUSE system will A/D convert the transmission signal for digital signal processing and restore it to the original television signal of the high definition system, to be used as an analog signal by D/A conversion afterwards. In this case, the clock signal used in A/D conversion and digital signal processing is created by frequency dividing the original oscillating signal of 97.2 MHz in phase with the synchronizing signal included in the television signal.

The current standard television system, the NTSC system for example, generates a color subcarrier of 3.58 MHz in synchronization with the color burst signal included in the horizontal blanking period in extracting the necessary color information from a carrier chrominance signal.

However, the standards of a standard television system, for example, the NTSC system and the high definition television system differ from each other. For example, the aspect ratio of the screen is 4:3 and the scanning lines 525 lines/frame in the NTSC system, while the high definition television system has an aspect ratio of 16:9 and 1125 lines/frame of scanning lines. The frequencies of the horizontal synchronizing signal and the vertical synchronizing signal also differ between the NTSC system and the high definition television system. Therefore, it is not easy to display a small image area of television signal under a standard television system within one portion of a large image area of television system under the high definition television system.

SUMMARY OF THE INVENTION

Accordingly, an object of the invention is to provide a television display apparatus having a picture-in-picture display function that can display a video signal from one signal source in a large image area of the screen of the television display apparatus, while displaying a video signal from the other signal source within one area in the large image area on the screen in accordance with the video signals included in the television signals of the different standards generated from two signal sources.

Another an object of the invention is to provide a PinPTV receiver that can display in combination an image area of a television signal under a standard television system within one part of a large image area of a television signal under the HDTV system.

Another object of the invention is to convert the number of scanning lines of the television signal under the standard system into the number of scanning lines adaptable to the number of scanning lines of the HDTV system, in a television display unit having the picture-in-picture display function.

A further object of the invention is to simplify the whole structure of a PinPTV receiver by commonly using a single oscillating signal source to each of circuits for forming a large area picture and for forming a small area picture.

Another object of the invention is to display in combination a small image area of the television signal included in one signal source system within one area of the large image area of the television signal included in the other signal source without degrading picture quality, even though the field frequencies differ between the video signal included in the television signals of different standards generated from two signal sources.

In summary, the present invention is a television receiver comprising a first receiving circuit for receiving a first television signal of first and second television signals of different standards generated from two signal sources, a second receiving circuit for receiving a second television signal, and a picture-in-picture display control circuit for displaying in combination a small image area of a second video signal included in the second television signal within an area of the large image area of a first video signal included in the above-mentioned first television signal. The display control circuit comprises a first clock signal generating means for generating a first clock signal in accordance with the synchronizing signal included in the first television signal, a second clock signal generating means in synchronism with a color burst signal included in the second television signal for generating a second clock signal having a frequency of L/K times (K, L are natural numbers) the frequency of the color subcarrier, scanning line number converting means for converting the number of scanning lines of the above-mentioned second television signal into a predetermined number in accordance with the ratio of the image area by the first television signal to the image area by the second television signal, writing clock generating means for generating a writing clock signal shifting the second clock signal by a predetermined phase of the clock cycle for every horizontal period, a memory for writing the video signal included in the second television signal from the scanning line number converting means with the writing clock generated by the writing clock generating means and reading out with the first clock signal, and substituting means for locally substituting the video signal read out from the above mentioned memory for the video signal included in the first television signal.

In operation, it is necessary for the first television signal and the second television signal to have the same signal band in order to locally substitute the picture by the second television signal for the picture by the first television signal. This is achieved by writing the second video signal into the memory with the frequency of L/K times the frequency of the color subcarrier included in the second television signal, and read out the second video signal using the first clock signal in synchronization with the synchronizing signal included in the first television signal.

This causes the clock signal of L/K times the frequency of the color subcarrier to be shifted by a predetermined phase of the clock cycle for each scanning line and for each frame. Consequently, the sampling position of each scanning line is shifted. To solve the problem of such sampling position shifting, a writing clock signal generating means generates a clock signal that is a second clock signal having the phase shifted by a predetermined clock cycle for every one horizontal period, whereby the video signal included in the second television signal is written into the memory using the above mentioned clock signal as the writing clock signal. As a result, the shifting of sampling positions is solved.

The video signal of the second television signal has the number of scanning lines converted by the scanning line number converting means for eliminating distortion in the image substituted for the large image area of the video signal included in the first television signal. With this conversion operation, it is possible to display a small image area without distortion.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figures 1, 2:
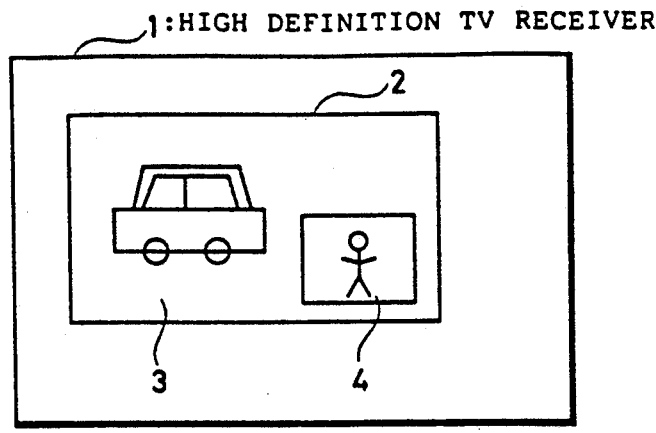
FIG. 1 is a diagram for explaining the picture-in-picture display method of the present invention.
FIG. 2 is a diagram for explaining the conversion of the number of scanning lines.

FIG. 1 is a diagram for explaining the picture-in-picture display method of the present invention.

Referring to FIG. 1, a picture-in-picture television receiver 1 displays a picture 3 in the large image area of the screen of a picture tube 2 in accordance with the television signal of the HDTV (high definition television) system, while displaying a picture 4 in the small image area on the screen in accordance with the television signal of a standard system (the NTSC system for example).

The television signal of the above mentioned HDTV system is restored by a MUSE decoder included in the PinPTV receiver 1. The frequency of the clock signal used for this restoration is 97.2 MHz, as mentioned above. The frequency of the color subcarrier of the NTSC system is 3.58 MHz.

The PinPTV receiver 1 displaying a small image area of television signals under the NTSC system within one portion of a large image area of television signals under the high definition television system will not require a new oscillator by writing the video signal for the small image area into field memories with the writing frequency of L/K times (K, L=1, 2, 3,...) the 3.58 MHz, and reading out the second video signal with the reading frequency of 1/Q times (Q=1, 2,...) the original oscillating frequency of 97.2 MHz, resulting in a simple and economical circuit structure.

The reading frequency of the video signal from the field memory for the small image area is selected as ½ of the original oscillating frequency, to coincide with the maximum clock frequency of the digital signal processing of the MUSE decoder. Consequently, the signal band of the video signal under the NTSC system will coincide with that of the MUSE decode signal allowing the display in combination of the picture of the small image area in the large image area. A ratio of about 1:3 is desirable for the ratio of the height of the small image area to the height of the large image area. The height ratio of 1:3 is used in the description of the present embodiment. To realize the relation, a frequency of 5.37 MHz (L=3, K=2) is selected as the writing frequency to the field memory, while a frequency of 48.6 MHz (97.2 MHz÷2, i.e. Q=2) is selected as the reading frequency from the field memory.

Figure 7:
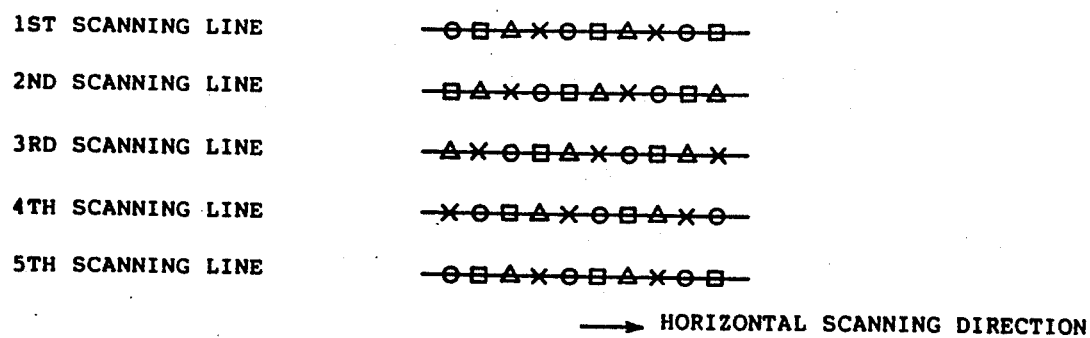
FIG. 7 is a diagram for explaining the shifting of the sampling patterns.

However, since the above mentioned frequency of 5.37 MHz is 1365/4 times the horizontal frequency of 15.750 KHz of the NTSC system, the phase is shifted by ¼ clock for every one horizontal scanning period and for every one frame (referred to FIG. 7). Deterioration in picture quality caused by this phase shifting may be eliminated by shifting the phase of the clock signal for writing by ¼ clock for every one horizontal period.

The number of horizontal scanning lines of the small image area with the above mentioned frequency relation selected is set up as below. Expressing the frequency of the color subcarrier fsc and the original oscillating frequency foc in prime numbers, the following equation is given.

$$fsc = 3.58 \text{ MHz} = \frac{2^3 \times 3^2 \times 5^7 \times 7 \times 13}{143} \text{ (Hz)} \quad (1)$$

$$foc = 97.2 \text{ MHz} = 2^7 \times 3^5 \times 5^5 \text{ (Hz)} \quad (2)$$

The horizontal scanning frequency of the high definition television system fH (HD) and the horizontal scanning frequency fH (NTSC) of the NTSC system are represented in the next equations, respectively.

$$fH \text{ (HD)} = 33.75 \text{ KHz} = 2 \times 3^3 \times 5^4 \text{ (Hz)} \quad (3)$$

$$fH \text{ (NTSC)} = 15.750 \text{ KHz} = \frac{2^4 \times 3^2 \times 5^6}{143} \text{ (Hz)} \quad (4)$$

Since the dimension unit of the picture element is different between the horizontal direction and the vertical direction, these dimensions should be made the same.

[TV lines] is used as the vertical direction dimension unit, while [seconds] is used as the horizontal direction dimension unit which indicates the time required to scan the picture element.

In the case where BTA (Broadcasting Technology Association) S-001 standard with the aspect ratio of 9:16, the sampling frequency of 74.25 MHz, the effective scanning lines of 1035 (TV lines), and the effective picture elements of 1920 is employed, the relationship is given as below:

$$1035 \text{ [TV lines]}: \frac{1920}{74.25 \text{ MHz}} \text{ [sec]} = 9:16 \quad (5)$$

This will result in:

$$5^2 \times 11 \times 23 \times fH \text{ (HD) [TV lines]} = 3 \text{ [sec]} \quad (6)$$

In the case where M scanning lines (M≦N) of the small image area video signal is formed from N scanning lines of the NTSC system, and locally substituting the small image area video signal for the video signal of the high definition television system provided from the MUSE decoder before time axis expansion of 12/11, the following relation must be established for achieving the aspect ratio of 3:4×11/12.

$$525 \times rV \times M/N \text{ [TV lines]}: x \text{ [sec]} = 3:4 \times 11/12$$

rV : current (NTSC) broadcasting vertical effective scanning period ratio=0.935 x : small image area horizontal effective scanning time

That is, $$x \text{ [sec]} = \frac{5^2 \times 7 \times 11 \times rV \times M}{3 \times N} \text{ [TV lines]} \quad (8)$$

When equation (6) is substituted into equation (8):

$$x = \frac{7 \times rV \times M}{23 \times fH \text{ (HD)} \times N} \text{ [sec]} \quad (9)$$

When the clock frequency for writing the small image area video signal into the memory is WCK, and the clock frequency for reading out from the memory is RCK, $$\frac{rH/fH \text{ (NTSC)}}{1/WCK} = \frac{x}{1/RCK} \quad (10)$$

rH : current (NTSC) broadcasting horizontal effective scanning period ratio=0.83.

That is:

$$\frac{N}{M} = \frac{7 \times rV \times fH \text{ (NTSC)} \times RCK}{23 \times rH \times fH \text{ (HD)} \times WCK} \quad (11)$$

The calculation of equation (11) gives the following:

$$\frac{N}{M} = \frac{2^7 \times 3 \times rV}{13 \times 23 \times rH} = 1.446\ldots \quad (12)$$

This means that when scanning line conversion of 1.446 . . . lines to 1 line is accomplished, the picture displayed in the small image area will be without figure distortion. However, the precise scanning line conversion of 1.446 . . . line to 1 line is difficult and will increase the scale of the circuit. Therefore, the scanning line conversion is facilitated by providing an allowable range in figure distortion.

For example, by providing a value of ±1% as the allowable range of figure distortion, N/M may be within the range of the following equation:

$$1.432\ldots = 0.99 \times \frac{2^7 \times 3 \times rV}{13 \times 23 \times rH} \leq \frac{N}{M} \leq 1.01 \times \quad (13)$$

$$\frac{2^7 \times 3 \times rV}{13 \times 23 \times rH} = 1.461\ldots$$

On selecting natural numbers where N, M are minimum in this range, N/M will become 13/9. This means that scanning line conversion of 13 lines to 9 lines is to be carried out.

FIG. 2 is a diagram for explaining the scanning line conversion of 13 lines to 9 lines. Referring to FIG. 2, A-N, A'-N' of the left side indicate the scanning lines of the first field and the second field by the NTSC system, respectively, while I-X, I'-X' of the right side indicate the scanning lines of the small image area displayed by the HDTV system. For producing 9 scanning lines (I-IX) in equal spacing from 13 scanning lines (A-M), the following arithmetic operation is carried out based on the current scanning line and the scanning line of 1 horizontal period before.

I=A×1
II=B×5/9+C×4/9
III=C×1/9+D×8/9
IV=E×6/9+F×3/9
V=F×2/9+G×7/9
VI=H×7/9+I×2/9
VII=I×3/9+J×6/9
VIII=K×8/9+L×1/9
IX=L×4/9+M×5/9

9 scanning lines can be produced by circulating the above coefficient pairs of (0,0), (1,0), (5/9, 4/9), (1/9, 8/9), (0, 0) (6/9, 3/9) (2/9, 7/9), (0, 0) (7/9, 2/9), (3/9, 6/9) (0, 0) (8/9, 1/9), (4/9, 5/9) for every 13 scanning lines.

For example, when the current signal is C of FIG. 2, the scanning line signal of II is obtained by multiplying the current signal of C by a coefficient of 4/9, multiplying the signal of 1 horizontal period before of B by a coefficient of 5/9, and adding these values. When the current signal is C', the scanning line signal of II' is obtained by multiplying the current signal of C' by a coefficient of 6/9, by multiplying the signal of 1 horizontal period before of B' by a coefficient of 3/9, and adding these values.

Thus, an image by 300 scanning lines of the HDTV system may be produced from the image by 433 scanning lines of the NTSC system.

Although the reading clock signal frequency Rck is 48.6 MHz and the writing clock frequency Wck is 5.37 MHz in the above embodiment, the reading clock frequency may be set within the range of 1/Q times the original oscillating frequency of the HDTV system, and the writing clock frequency may be L/K times (L, K are natural numbers) the 3.58 MHz. The conversion ratio N/M of the scanning lines can be defined by the relation of the frequencies, the height with respect to the small image area and the large image area, and the allowable error.

The summary of the frequencies relation and the conversion ratio N/M of the scanning lines are shown in Tables 1, 2 and 3. The present embodiment is taken from the third line of Table 1 where the error is within 1%.

TABLE 1

NTSC Horizontal Effective Scanning Period Ratio; rHeff (NTSC) = 0.85
NTSC Vertical Effective Scanning Period Ratio; rVeff (NTSC) = 0.935

| WcK (MHz) | RcK (MHz) | $\frac{N}{M}$ | $\left(\frac{N}{M}\right)$ min | $\left(\frac{N}{M}\right)$ max | $\frac{N}{(Mmin)}$ | $\frac{N}{2^m min}$ |
|---|---|---|---|---|---|---|
| | | | Within 1% Error | | | |
| 3.58 | 24.3 | 1.0851 | 1.0742 | 1.0959 | 12/11 | 35/32 |
| 3.58 | 32.4 | 1.4468 | 1.4323 | 1.4612 | 13/9 | 23/16 |
| 5.37 | 48.6 | 1.4468 | 1.4323 | 1.4612 | 13/9 | 23/16 |
| 7.16 | 48.6 | 1.0851 | 1.0742 | 1.0959 | 12/11 | 35/32 |

TABLE 2

| Within 3% Error | | | | Within 5% Error | | | |
|---|---|---|---|---|---|---|---|
| $\left(\frac{N}{M}\right)$ min | $\left(\frac{N}{M}\right)$ max | $\frac{N}{(Mmin)}$ | $\frac{N}{2^m min}$ | $\left(\frac{N}{M}\right)$ min | $\left(\frac{N}{M}\right)$ max | $\frac{N}{(Mmin)}$ | $\frac{N}{2^m min}$ |
| 1.0525 | 1.1176 | 10/9 | 17/16 | 1.0308 | 1.1393 | 9/8 | 9/8 |
| 1.4033 | 1.4902 | 10/7 | 23/16 | 1.3744 | 1.5191 | 3/2 | 3/2 |
| 1.4033 | 1.4902 | 10/7 | 23/16 | 1.3744 | 1.5191 | 3/2 | 3/2 |
| 1.0525 | 1.1176 | 10/9 | 17/16 | 1.0308 | 1.1393 | 9/8 | 9/8 |

TABLE 3

| Within 10% Error | | | | Within 20% Error | | | |
|---|---|---|---|---|---|---|---|
| $\left(\frac{N}{M}\right)$ min | $\left(\frac{N}{M}\right)$ max | $\frac{N}{(Mmin)}$ | $\frac{N}{2^m min}$ | $\left(\frac{N}{M}\right)$ min | $\left(\frac{N}{M}\right)$ max | $\frac{N}{(Mmin)}$ | $\frac{N}{2^m min}$ |
| 0.9766 | 1.1936 | 1/1 | 1/1 | 0.8681 | 1.3021 | 1/1 | 1/1 |
| 1.3021 | 1.5914 | 3/2 | 3/2 | 1.1574 | 1.7361 | 3/2 | 3/2 |
| 1.3021 | 1.5914 | 3/2 | 3/2 | 1.1574 | 1.7361 | 3/2 | 3/2 |
| 0.9766 | 1.1936 | 1/1 | 1/1 | 0.8681 | 1.3021 | 1/1 | 1/1 |

Figure 3:
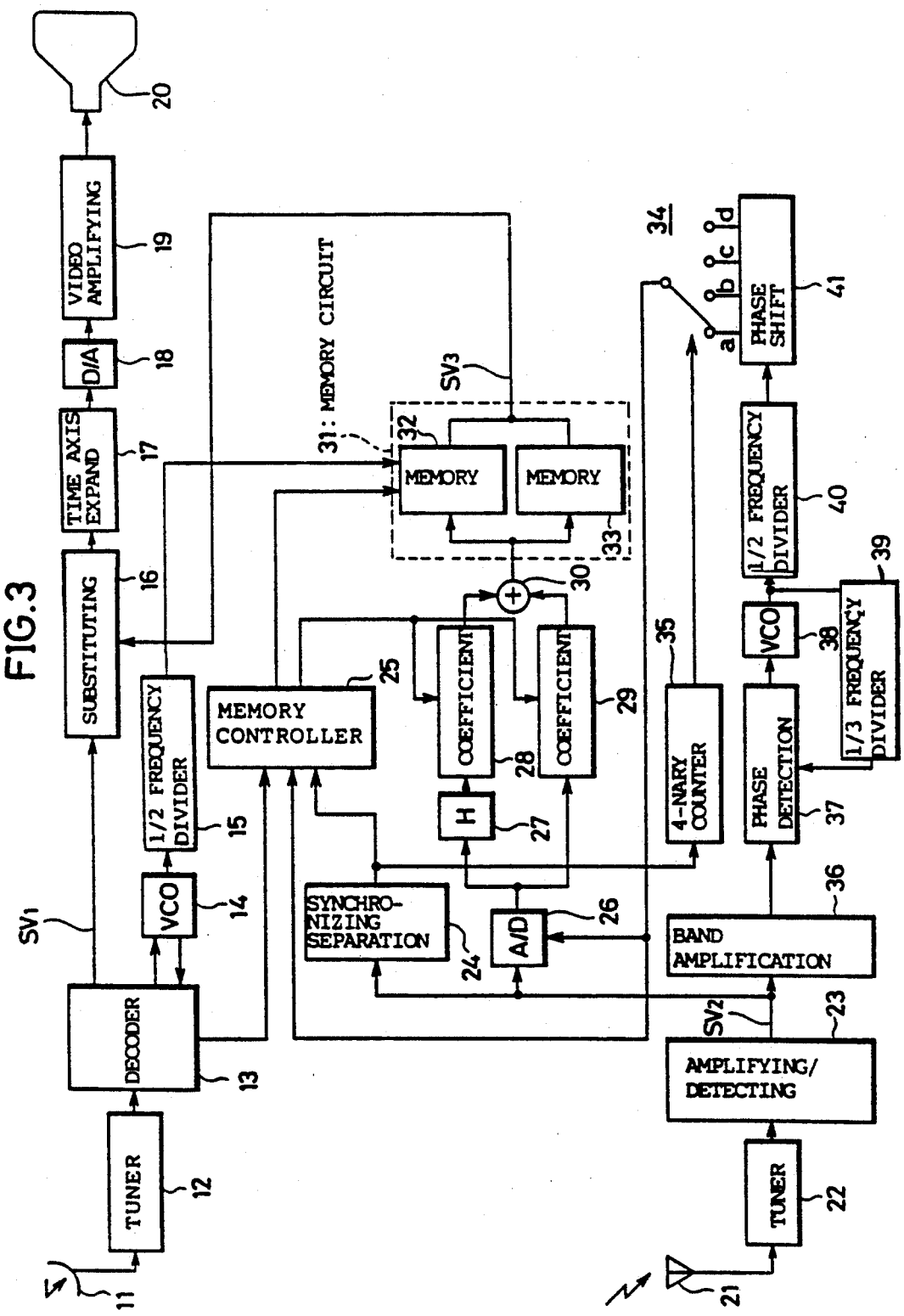
FIG. 3 is a block diagram showing one example of the picture-in-picture television display apparatus of the present invention.

FIG. 3 is a block diagram showing an embodiment of a PinPTV receiver for implementing the PinPTV display method.

Referring to FIG. 3, a satellite broadcasting signal received by an antenna 11 is applied to a tuner 12. The MUSE signal from tuner 12 is applied to a MUSE decoder 13. This MUSE signal is band-compressed to 8.1 MHz at the transmitting side. In MUSE decoder 13, the MUSE signal is A/D converted for digital signal processing to obtain a video signal SV1 of the high definition television system with a sampling frequency of 48.6 MHz.

A clock signal in synchronism with the synchronizing signal included in the MUSE signal is provided from a voltage controlling oscillator 14. Digital signal processing is performed in accordance with this clock signal.

The video signal SV1 provided from decoder 13 is applied to a local substituting circuit 16 as the video signal for the large image area. The vertical synchronizing signal and horizontal synchronizing signal generated at MUSE decoder 13 are provided to a memory control circuit 25 as the synchronizing signal for the large image area.

Meanwhile, the ground broadcasting signal received by an antennae 21 is provided to a tuner 22. The intermediate frequency signal from tuner 22 is provided to an amplifying/detecting circuit 23. Video signal SV2 of the NTSC system provided from circuit 23 is applied to an A/D converter 26.

Video signal SV2 converted into a digital signal at A/D converter 26 is provided to a coefficient multiplier 29 formed of ROM (Read Only Memory) to be multiplied by a predetermined coefficient. The output of coefficient multiplier 29 is applied to an adder 30. Video signal SV2 passes a delay element 27 having a delay time of 1 horizontal period to be provided to a coefficient multiplier 28 formed of ROM, where a predetermined coefficient is multiplied. The output of coefficient multiplier 28 is applied to adder 30. The output signal of adder 30 is provided to field memories 32, 33 of a memory circuit 31, so that the same may be written field alternately into memories 32, 33.

Video signal SV2 from circuit 23 is provided to a synchronizing separating circuit 24. The vertical synchronizing signal and horizontal synchronizing signal separated in synchronizing separating circuit 24 are provided to a memory control circuit 25 as the synchronizing signal for the small image area.

The coefficients to be used in the multiplication in coefficient multipliers 28, 29 are controlled by a coefficient ROM address control portion included in memory control circuit 25 in accordance with the synchronizing signal for the small image area.

Figure 4:
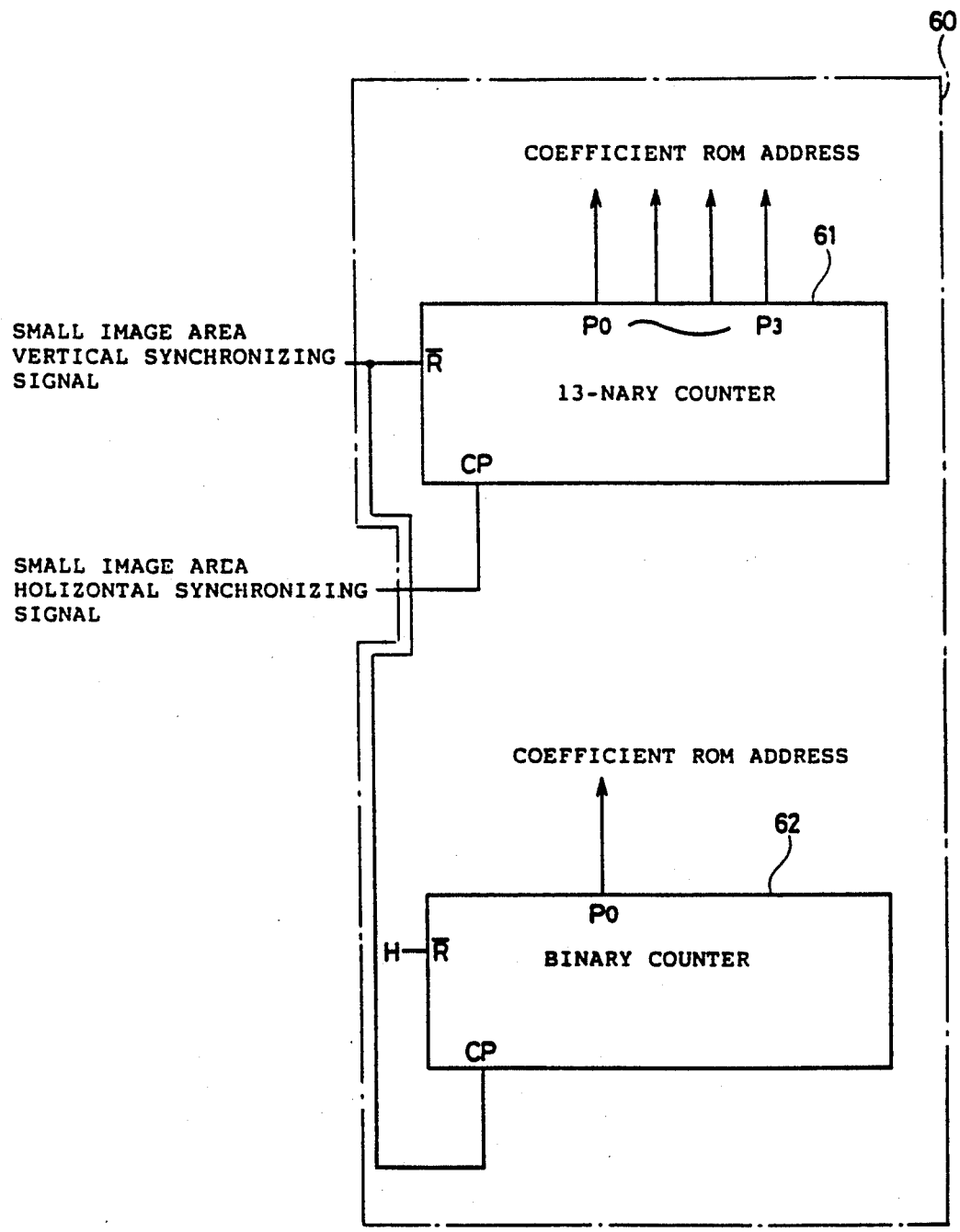
FIG. 4 is a circuit diagram of a coefficient address generation portion included in the memory control circuit of FIG. 3.
Figure 5:
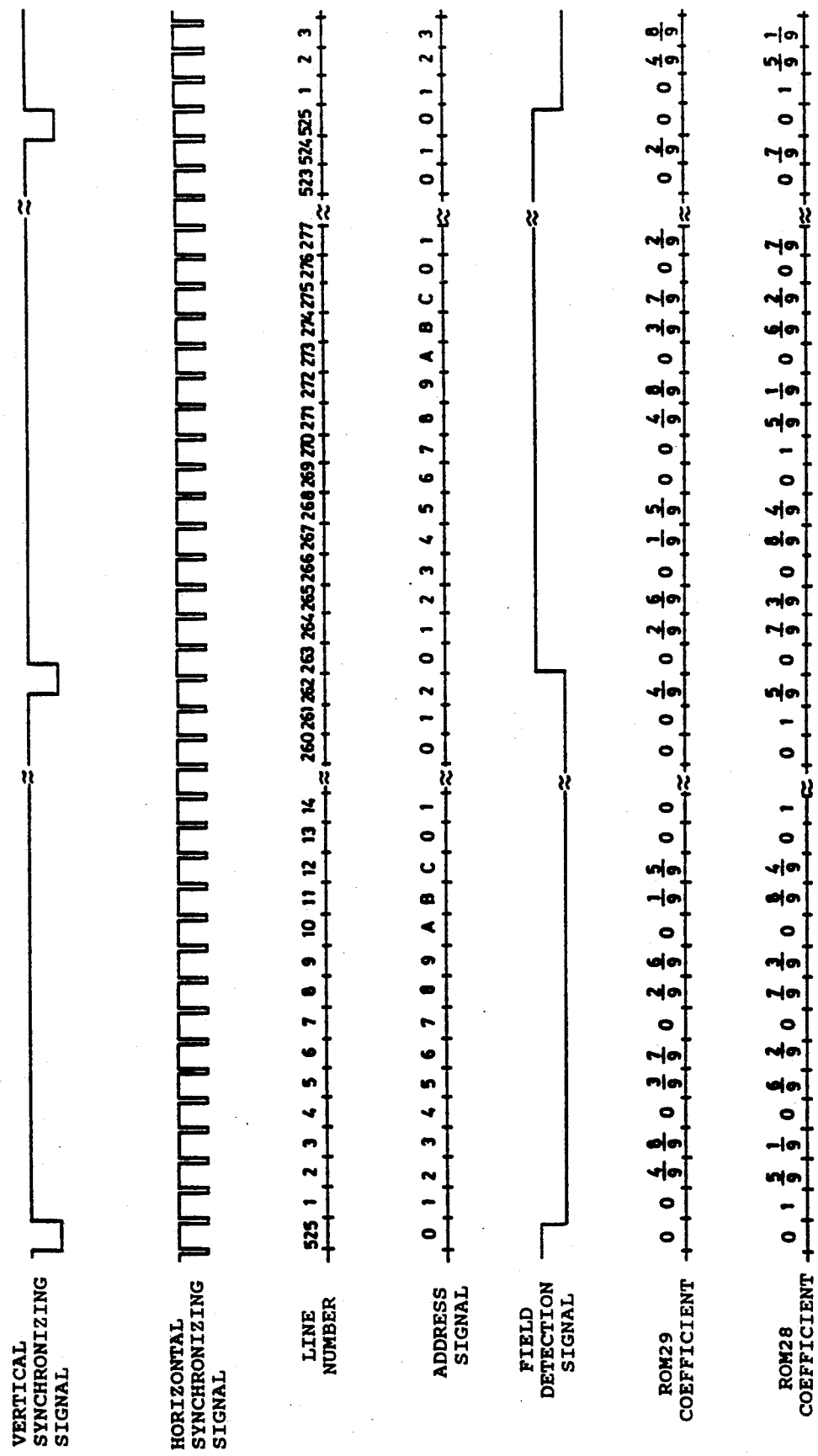
FIG. 5 is a timing chart of various signals of the coefficient address generation portion of FIG. 4.

FIG. 4 is a circuit diagram showing an example of the coefficient ROM address control portion 60 included in the above mentioned memory control circuit 25, while FIG. 5 is a timing chart of various signals of the coefficient ROM address control portion 60.

Referring to FIGS. 4 and 5, ROM address control portion 60 comprises a 13-nary counter 61 receiving the small image area vertical synchronizing signal as the reset input and counting the small image area horizontal synchronizing signal for providing an address signal of 4 bits, and a binary counter 62 for counting the small image area vertical synchronizing signal and providing a field detection signal of 1 bit.

The coefficient ROM address control portion 60 is the circuit where the conversion of the above mentioned scanning lines of 13 lines to 9 lines is implemented. The coefficients used in the scanning line conversion circulates for every 13 scanning lines, wherein the starting coefficient of the circulation differs by fields. Therefore, an address signal of 5 bits which is the total of the 4 bits of the output of 13-nary counter 61 and 1 bit of the field detection signal is applied to the ROMs of coefficient multipliers 28, 29 from memory control circuit 25 for control.

Thus, the current signal provided from A/D converter 26 and the signal delayed by 1 horizontal period which is provided from delay element 27 are multiplied by predetermined coefficients in coefficient multipliers 29, 28, respectively, whereby the product output of coefficient multipliers 29, 28 are added at adder 30, with the result that scanning line conversion of 13 lines to 9 lines is performed.

Video signal SV2 from amplifying/detecting circuit 23 is provided to band amplifying circuit 36. The color burst signal extracted from band amplifying circuit 36 is provided to a phase detecting circuit 37. The phase error signal from phase detecting circuit 37 is provided to voltage controlled oscillator (VCO) 38. The output signal of voltage controlled oscillator 38 passes a frequency divider 39 with a frequency dividing ratio of ½ to be provided to phase detecting circuit 37.

Phase detecting circuit 37, voltage controlled oscillator 38, and frequency divider 39 implement an automatic phase control. A sine wave signal having a frequency of 3 times the frequency of the color subcarrier of 3.58 MHz in phase synchronization with the color burst signal is provided from voltage controlled oscillator 38. The sine wave signal is provided to a frequency divider 40 with a frequency dividing ratio of ½ after being waveform-shaped.

A clock signal of 5.37 MHz which is 3/2 times the frequency of the color subcarrier is provided from frequency divider 40. The horizontal synchronizing signal separated at synchronizing separating circuit 24 is provided to a 4-nary counter 35 to obtain a signal of 4 horizontal period cycle.

This 4-horizontal-cycle signal is provided to a switch 34 as a control signal.

Figure 6:
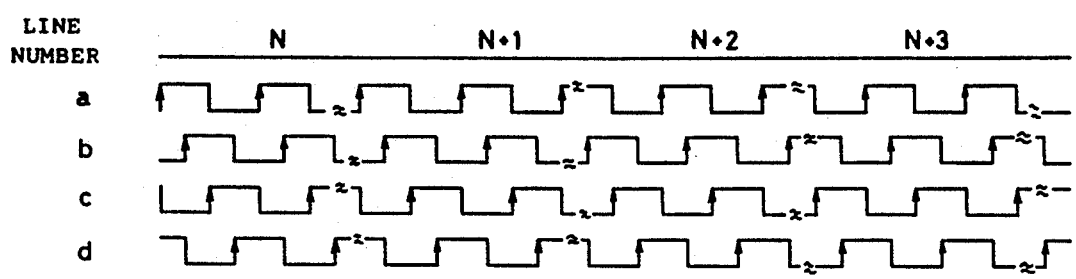
FIG. 6 is a timing chart of various signals of the phase shifting circuit.

The output signal of frequency divider 40 is provided to phase shifting circuit 41 where four clock signals (frequency is 5.37 MHz) each delayed in phase by ¼ clock cycles are generated, as shown in the output waveform diagram of FIG. 6. The four clock signals are provided to terminals a, b, c and d of switch 34, respectively.

The output signal sequentially selected as a, b, c and d for every 1 horizontal cycle by the control signal from 4-nary counter 35 is provided to A/D converter 26 as the clock signal for sampling, and also provided to memory circuit 31 as the clock signal for writing.

The frequency of 5.37 MHz is 1365/4 times the horizontal frequency of the NTSC system, and the phase is shifted by ¼ clock cycle for every scanning line and every frame. If this is directly used as the clock signal, a sampling pattern as shown in FIG. 7 is generated with the positions shifted spatially. In FIG. 7, ○, X, △, □ are the sample positions of the 4n-th frame, 4n+1-th frame, 4n+2-th frame, 4n+3-th frame, respectively.

Such position shifting is corrected by providing phase shifting circuit 41 and switch 34 for using as the clock signal a signal of 5.37 MHz shifted in phase by ¼ clock cycle for every 1 horizontal period.

From voltage controlled oscillator 14, a signal with the frequency of 97.2 MHz is outputted. This frequency signal is provided to a frequency divider 15 with the frequency dividing ratio of ½, wherein the frequency divided output of 48.6 MHz frequency is obtained. This frequency divided output is provided to memory circuit 31 as the clock signal for reading.

In memory control circuit 25, the determination is made whether the large image area television signal and the small image area television signal are of the first field or of the second field in accordance with the large image area synchronizing signal and the small image area synchronizing signal, similar to the above described Japanese Patent Publication.

The reading from memory circuit 31 is controlled so that the reading is carried out from the field memory that is not being written. At this time, if video signal SV1 is of the second field and the small image area video signal read out from memory circuit 31 is of the first field in accordance with the above mentioned determination result, the reading of the small image area video signal is controlled to be delayed by 1 horizontal line.

The small image area video signal SV3 read out from memory circuit 31 is provided to local substituting circuit 16. The local substituting circuit 16 locally substitutes the small image area video signal SV3 for the large image area video signal SV1 provided from MUSE decoder 13. The synthesized signal provided from local substituting circuit 16 is provided to a time axis expanding circuit 17 to be time axis expanded by a ratio of 12/11. This is because video signal SV1 provided from MUSE decoder 13 is time axis compressed to 11/12. For example, 12 seconds is converted to 11 seconds.

The synthesized video signal provided from time axis expanding circuit 17 is converted to an analog signal by D/A converter 18. The converted analog signal is provided to picture tube 20 via video amplifying circuit 19. As a result, picture tube 20 displays a combined picture where a picture of video signal SV3 is locally substituted for a portion of a large image area of video signal SV1.

It should be appreciated that though the signal processing of only the luminance signal is described in the above embodiment for simplifying the explanation, a similar signal processing is performed for also the chrominance signal.

In accordance with the above described embodiment, it is possible to display a combined picture by substituting the small image area picture having a signal band identical to that of the MUSE decode signal for the large image area, because the clock frequency for reading out from memory circuit 31 is 48.6 MHz which coincides with the maximum clock frequency of the digital signal processing of the MUSE decoder.

In this case, since a signal having a frequency of 3/2 times the 3.58 MHz shifted in phase by ¼ clock cycle for every one horizontal period is used as the clock signal for writing, spatial position shifting can be corrected.

Although the embodiment employing the NTSC system as the standard system is shown in the foregoing, this invention is likewise applicable to television display apparatuses employing the PAL system or the SECAM system.

The PinPTV receiver of FIG. 3 operates as will be described hereinafter for achieving proper interlace relation, similar to the conventional example (the aforementioned Japanese Patent Publication). When the large image area video signal is of the second field and the small image area video signal is of the first field, the reading of the small image area video signal is delayed by 1 horizontal period. This results in a problem that the position of the picture is shifted by one scanning line.

The case of HDTV system and NTSC system in combination is considered. Since the field frequency of the HDTV system is 60 Hz, and the field frequency of the NTSC system is 59.94 Hz, the above mentioned shifting of the scanning line leads to deterioration in the picture quality.

Figure 8:
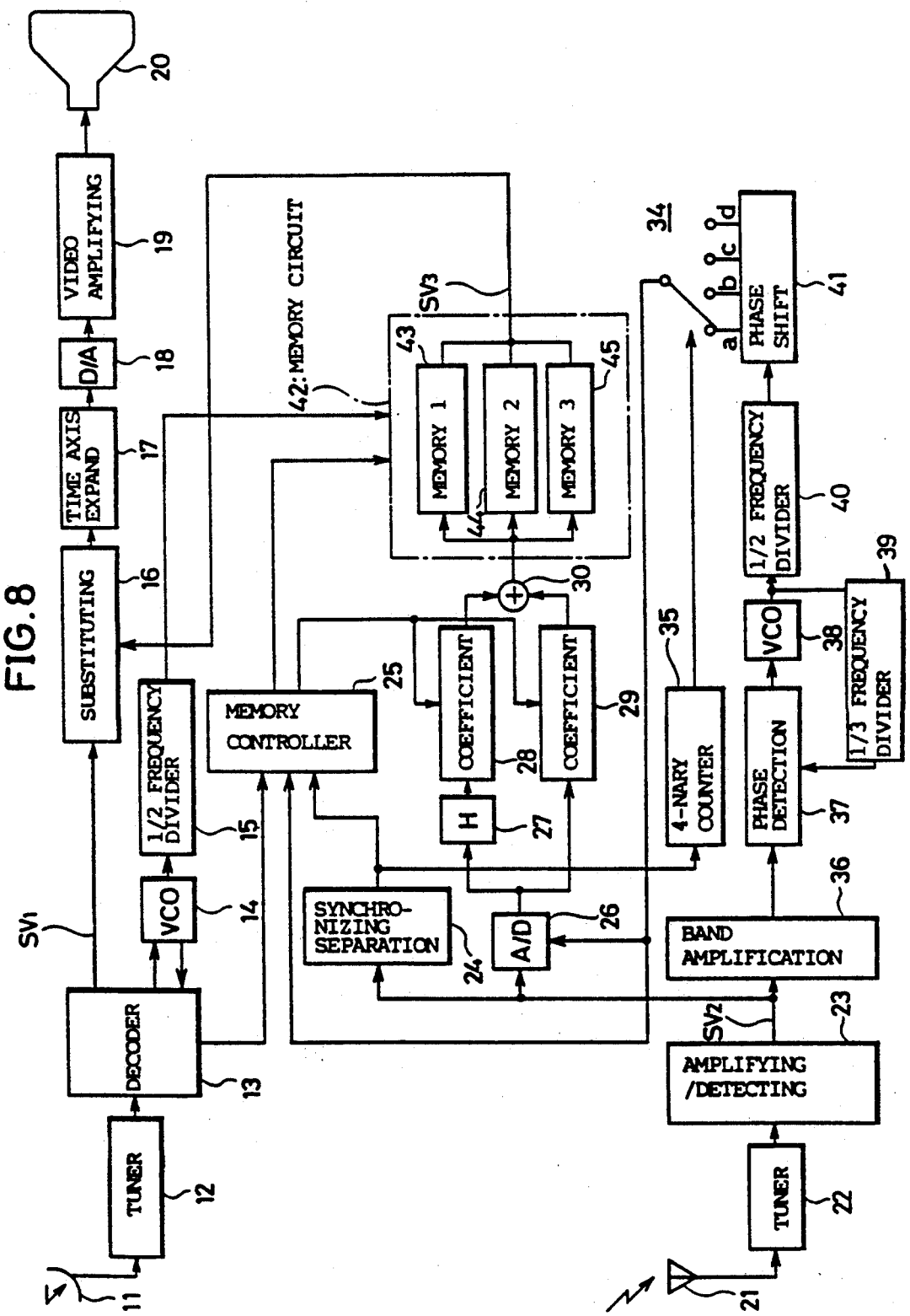
FIG. 8 is a block diagram showing a second embodiment of the present invention.
Figure 9:
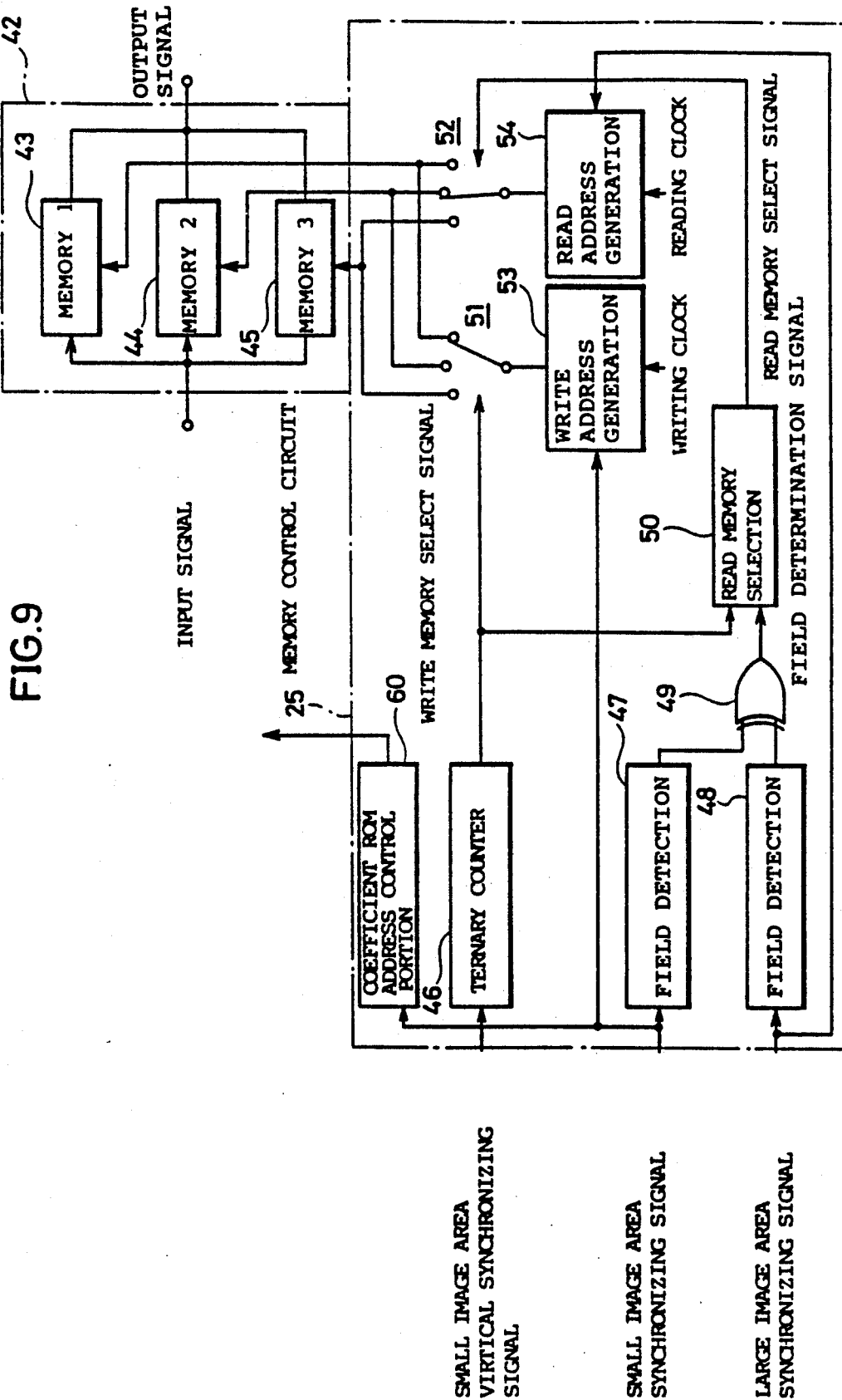
FIG. 9 is a diagram for explaining the memory control circuit.

A PinPTV receiver that solves this problem is shown in FIGS. 8 and 9. FIG. 8 is a block diagram showing the second embodiment of the PinPTV receiver. The same references as those of FIGS. 3 and 4 indicate the same elements so these descriptions will be omitted.

The output signal of adder 30 (small image area video signal) is sequentially written by 1 field into the three field memories 43, 44, and 45 forming memory circuit 42.

As described above, the video signal of the small image area to be substituted for a portion of the large image area is read out from the three filed memories 43, 44, 45 of memory circuit 42. The three field memories are selected by memory control circuit 25 so that the field of the read out small image area video signal is identical to the current field of the large image area video signal and the reading address does not precede the writing address.

FIG. 9 is a block diagram showing the memory control circuit 25 in detail.

The small image area vertical synchronizing signal is provided to a ternary counter 46 as a clock input, whereby a write memory select signal is output. The write memory select signal is applied to switch 51 as the control signal to select the field memory to be written.

A writing clock from switch 34 (the second clock signal) shifted in phase by ¼ clock cycle and the small image area synchronizing signal are provided to write address generating circuit 53 to generate a write address. The generated write address is provided to a particular field memory selected by switch 51 to carry out the writing of the small image area video signal.

A reading clock (the first clock signal) from frequency divider 15 and the large image area synchronizing signal are provided to read address generating circuit 54 to generate a read address. The generated read address is provided to a particular field memory selected by switch 52 to carry out the reading of the small image area video signal.

The small image area synchronizing signal is also provided to field detecting circuit 47, whereby logic level L or H is outputted depending upon whether the current field is of the first field or the second field. The large image area synchronizing signal is likewise provided to field detecting circuit 48, whereby logic level L or H is outputted depending upon whether the current field is of the first field or the second field.

Both the small image area field detection signal and the large image area field detection signal are provided to an exclusive OR circuit 49 to generate a field determination signal. This field determination signal is provided to read memory selecting circuit 50 along with write memory select signal to generate a read memory select signal. The aforementioned switch 52 is controlled by this read memory select signal.

The read memory selecting circuit 50 may comprise a ROM (Read Only Memory) having a write memory select signal and a field determination signal as the address input. The truth table of this determination logic is shown in Table 4.

TABLE 4

| Write Memory Select Signal | Field Determination Signal | Read Memory Select Signal |
|---|---|---|
| 1 | L | 2 |
|   | H | 3 |
| 2 | L | 3 |
|   | H | 1 |
| 3 | L | 1 |
|   | H | 2 |

Referring to Table 4, when the write memory is field memory 43 and the field determination signal is L, that is, when the large and small image area video signals are of the same polarity field (the same field), field memory 44 having the same polarity field as the large image area video signal is selected as the read memory out of field memories 44 and 45 which are not being written.

When the write memory is field memory 43 and the field determination signal is H, that is, when the large and small image area signals are of the opposite polarity field (different fields), field memory 45 having the same polarity field as the large image area video signal is selected as the read memory, out of field memories 44 and 45.

With this memory selecting logic, memory controller 25 reads out the video signal written in turn as (the first field, the second field, the first field), (the second field, the first field, the second field), ( . . . ) in field memories 43, 44, and 45.

By carrying out the above described reading process, the relation of the first and second fields of the small image area to be locally substituted can be made to coincide with the relation of the first and second fields of the large image area. Therefore, in the case of locally substituting the picture of television signals of one system for another system in combination where the frequencies of the fields differ because of different signal systems between the large image area and the small image area, such as where the large image area video signal is a high definition television signal (field frequency is 60 Hz) and the small image area video signal is a current standard television signal (field frequency is 59.94 Hz), deterioration in picture quality due to position shifting of the picture will not occur.

Thus, the small image area video signal read out from memory circuit 42 is provided to the small image area local substituting circuit 16.

The memory control circuit 25 of FIG. 9 can be adapted to a PinPTV receiver displaying the same standard system video signals by picture-in-picture function, whereby the problem of position shifting of one horizontal scanning line is solved.

By forming a memory circuit of 3 field memories, the necessity of carrying out interlace correction for delaying the reading of the small image area video signal by one horizontal scanning period is eliminated.

Therefore, even where the frequency of the fields differ because of different signal system between a large image area and the small image area, in the case of locally substituting the picture of television signals of one system for another system in combination, such as where the large image area video signal is a high definition television signal and the small image area video signal is a current standard television signal, the deterioration of picture quality due to position shifting of the picture can be greatly improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television display apparatus comprising:
   first television signal receiving means for receiving a first television signal of a first color television standard system,
   second television signal receiving means for receiving a second television signal of a second color television standard system,
   said first television signal including at least a horizontal synchronizing signal and a vertical synchronizing signal of the standard type defined by the first color television standard system,
   said second television signal including a horizontal synchronizing signal, a vertical synchronizing signal, a color burst signal, a video signal, a chrominance signal of the standard type defined by the second color television standard system, and
   picture display means, coupled to said first and second television signal receiving means, having a screen for displaying pictures of said first and second television signals,
   composite picture display control means for displaying a picture by said first television signal in a large image area on the screen of said picture display means, and displaying a picture by said second television signal in a small image area within said large image area by locally substituting for the picture of said first television signal, to display on the screen of said picture display means a composite picture having a picture of said second television signal nested in the picture of the first television signal,
   said composite picture display control means comprising
   said first clock signal generating means for generating a first clock signal associated with the horizontal synchronizing signal and the vertical synchronizing signal including in said first television signal,
   second clock signal generating means for generating a second clock signal in synchronism with the color burst signal included in said second television signal, and having a frequency of L/K times ($K \leq L$, K and L are natural numbers) the frequency of the color subcarrier,
   scanning line number converting means for converting the number of signal scanning lines of the second television signal to the number in which the scanning lines of the picture of the first television signal in the large image area is included within the height of the small image area, in accordance with the ratio of the height of the large image area to the height of the small image area,
   writing clock generating means for generating a plurality of writing clock signal trains shifting said second clock signal in turn by a predetermined phase of a clock style selected so as to correct the phase shifting between the cycle of said second clock signal and the cycle of the horizontal scanning of the second television signal, for every 1 horizontal period,
   memory means for storing the second video signal written therein from said scanning line number converting means in response to the cycle of the writing clock from said writing clock generating means and read therefrom in response to said first clock signal, and
   substituting means for substituting the video signal associated with the second television signal read out from said memory means for a portion of the video signal included in said first television signal.

2. The television display apparatus according to claim 1, wherein said first clock signal generating means comprises a voltage controlled oscillator coupled to said first receiving means for generating a clock signal in synchronization with the horizontal synchronizing signal and the vertical synchronizing signal included in the first television signal from the first receiving means.

3. The television display apparatus according to claim 1, wherein said second clock signal generating means comprises phase locked loop means for synchronizing the phase of the color burst signal included in said second television signal with the frequency of L times the frequency of the color subcarrier, and 1/K frequency dividing means for frequency dividing the phase synchronizing signal generated from said phase locked loop means by K.

4. The television display apparatus according to claim 1, wherein said writing clock generating means comprises phase shifting means for shifting the phase of said second clock signal by a predetermined amount of the clock cycle selected so as to correct the phase shifting between the cycle of said second clock signal and the cycle of the horizontal scanning of said second television signal, for every 1 horizontal period, to generate a plurality of clock signal trains which differ in phase from each other by a predetermined amount, and selecting means connected to said phase shifting means responsive to the horizontal synchronizing signal included in the second television signal for selecting one of said plurality of clock signal trains obtained from said phase shifting means for every scanning line.

5. The television display apparatus according to claim 1, wherein said scanning line number converting means comprises two coefficient multiplying means responsive to the horizontal synchronizing signal included in the second television signal for multiplying the video signal of the preceding horizontal scanning period delayed by one horizontal scanning period and the current video signal of the horizontal scanning period by different coefficients, respectively, and adding means for adding the two multiplied values from said coefficient multiplying means.

6. The television apparatus according to claim 1, wherein said memory means comprises three field memories for storing the video signal included in said second television signal written therein in response to the cycle of the writing clock generated from said writing clock generating means and read therefrom in response to the cycle of the first clock signal generated from said first clock signal generating means, first field detecting means for detecting whether the video signal of the large image area currently scanned is of the first field or the second field, in accordance with the horizontal synchronizing signal and the vertical synchronizing signal included in said first television signal, second field detecting means for detecting whether the second video signal currently written is of the first field or the second field, in accordance with the horizontal synchronizing signal and the vertical synchronizing signal included in said second television signal, and read memory selecting means responsive to the determination signal of said first and second field detecting means for selecting, out of the three field memories, the field memory not being currently written and having a field which is identical to that of the first field video signal being currently scanned.

7. In a television display apparatus comprising, first television signal receiving means for receiving a first television signal of a first color television standard system, second television signal receiving means for receiving a second television signal of a second color television standard system, said first television signal including at least a horizontal synchronizing signal and a vertical synchronizing signal of the standard type defined by the first color television standard system, said second television signal including a horizontal synchronizing signal, a vertical synchronizing signal, a color burst signal, a video signal, a chrominance signal of the standard type defined by the second color television standard system, and picture display means coupled to said first and second television signal receiving means for displaying pictures of said first and second television signals, a method of displaying a picture of said first television signal in a large image area on the screen of said picture display means, and displaying a picture of the second television signal in a small image region within said large image area by locally substituting for the picture of said first television signal, so that a composite picture having the picture of said second television signal is nested in the picture of the first television signal on the screen of said picture display means, comprises the steps of:

generating a clock signal in synchronism with the color burst signal included in said second television signal and having a frequency of L/K times ($K \leq L$, K and L are natural numbers) the frequency of the color subcarrier, generating a plurality of writing signal trains by shifting the phase of the clock signal generated by said step of generating a clock signal by a predetermined amount of the clock cycle selected so as to correct the phase shifting between the cycle of said second clock signal and the cycle of the horizontal scanning of said second television signal, for every 1 horizontal period of the second television signal, generating a reading clock signal associated with the horizontal synchronizing signal and the vertical synchronizing signal included in said first television signal, converting the number of scanning lines of the second television signal to the number in which the scanning lines of the picture of the first television signal in the large image area is included within the height of the small image area, in accordance with the ratio of the height of the large image area to the height of the small image area, writing into the field memory the second video signal generated in said step of converting the second television signal scanning line number in response to the cycle of the writing clock signal generated in said step of generating a plurality of writing signal trains, reading the second video signal written into the field memory in said step of writing the second video signal in response to the cycle of the generated reading clock signal, and substituting the video signal associated with the second television signal read out in said step of reading the second video signal for one portion of the video signal included in said first television signal.

8. A television display apparatus comprising:
first television signal receiving means for receiving a first television signal of a first television standard system,
second television signal receiving means for receiving a second television signal of a second television standard system,
said first television signal including a first synchronizing signal and a video signal of the standard type defined by said first television standard system,
said second television signal including a second synchronizing signal and a video signal of the standard type defined by said second television standard system,
picture display means, coupled to said first and second television signal receiving means, having a screen for displaying pictures of said first and second television signals, and
composite picture display control means for displaying a picture by said first television signal in a large image area on the screen of said picture display means, and displaying a picture by said second television signal in a small image area within said large image area by locally substituting for the picture of said first television signal, to display on the screen of said picture display means a composite picture having a picture of said second television signal nested in the picture of said first television signal,
said composite picture display control means comprising
means for generating a write clock signal in synchronization with a second synchronizing signal included in said second television signal,
means for generating a read clock signal in synchronization with a first synchronizing signal included in said first television signal,
three field memories, each having the video signal included in said second television signal written therein according to the cycle of said generated write clock signal, and having said written video signal read out therefrom according to the cycle of said generated read clock signal,
first field detecting means for detecting whether the video signal included in said first television signal is a signal of the first field or the second field,
second field detecting means for detecting whether the video signal included in said second television signal is a signal of the first field or the second field, and
means responsive to the detection signals from said first field detecting means and said second frame detecting means for selecting, out of said three field memories, the field memory not being currently scanned and having a field which is identical to that of the first video signal being currently scanned.

9. The television display apparatus according to claim 8, wherein said first television standard system is identical to said second television standard system.

10. The television display apparatus according to claim 8, wherein the field frequency of said first television standard system is substantially identical to that of said second television standard system.

11. A television display apparatus comprising:
first television signal receiving means for receiving a first television signal of a first television standard system,
second television signal receiving means for receiving a second television signal of a second television standard system,
said first television signal including a first synchronizing signal and a video signal of the standard type defined by said first television standard system,
said second television signal including a second synchronizing signal and a video signal of the standard type defined by said second television standard system,
picture display means, coupled to said first and second television signal receiving means, having a screen for displaying pictures of said first and second television signals, and
composite picture display control means for displaying a picture by said first television signal in a large image area on the screen of said picture display means, and displaying a picture by said second television signal in a small image area within said large image area by locally substituting for the picture of said first television signal, to display on the screen of said picture display means a composite picture having a picture of said second television signal nested in the picture of said first television signal,
said composite picture display control means comprising
means for generating a write clock signal in synchronization with a second synchronizing signal included in said second television signal,
means for generating a read clock signal in synchronization with a first synchronizing signal included in said first television signal,
scanning line number converting means for converting the number of scanner lines of the second television signal to the number in which the scanning lines of the picture of the first television signal in the large image area conforms to the height of the small image area, in accordance with the ratio of the height of the large image area to the height of the small image area,
three field memories, each having the video signal from said scanning line number converting means written therein with the cycle of said generated write clock signal, and having said written video signal read out therefrom with the cycle of said generated read clock signal,
first field detecting means for detecting whether the video signal included in said first television signal is a signal of the first field or the second field,
second field detecting means for detecting whether the video signal included in said second television signal is a signal of the first field or the second field, and
means responsive to the detection signals from said first field detecting means and said second frame detecting means for selecting, out of said three field memories, the field memory not being currently written and having a field which is identical to that of the video signal included in the first television signal being currently scanned.

* * * * *